Patented July 3, 1928.

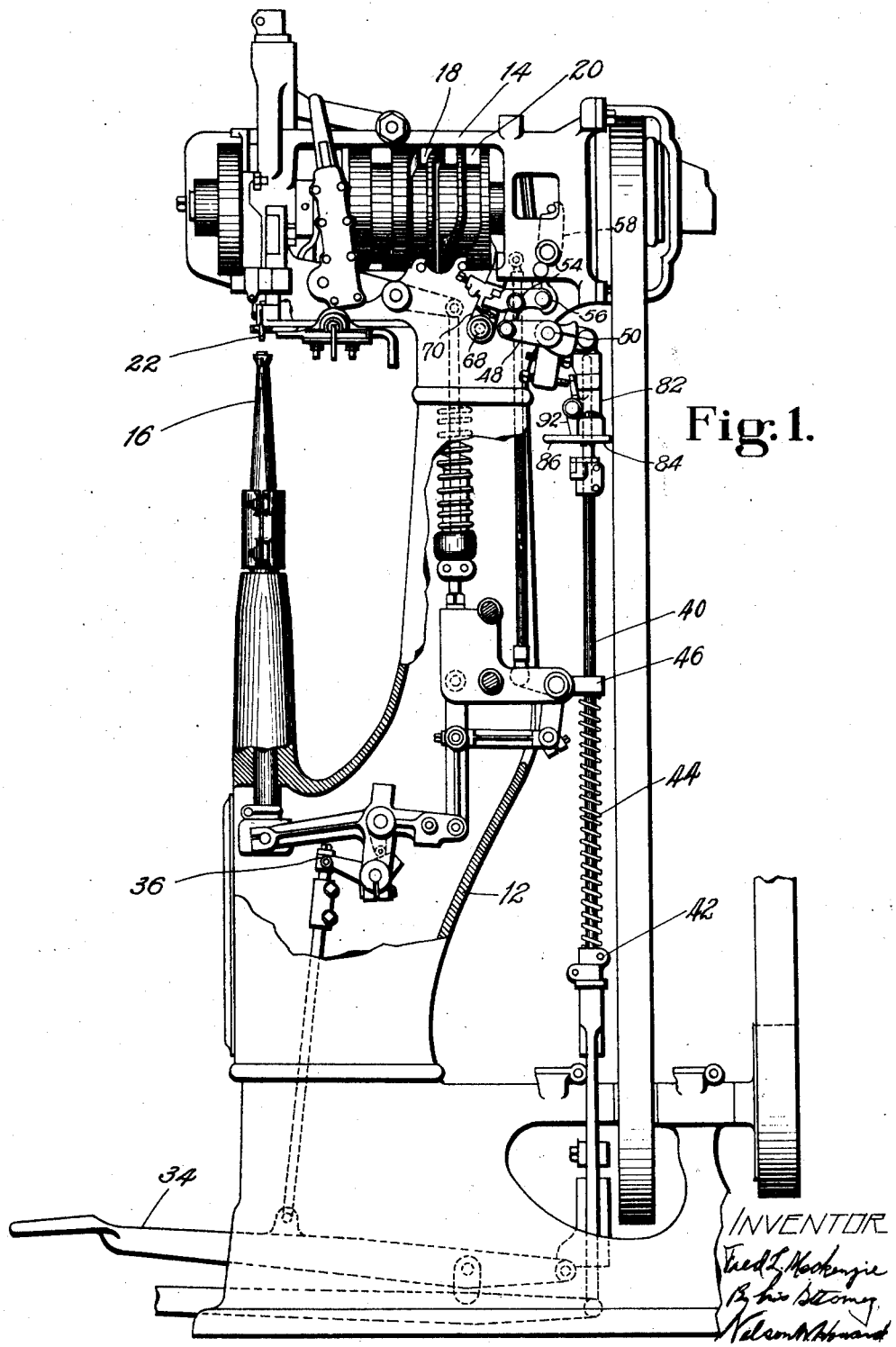

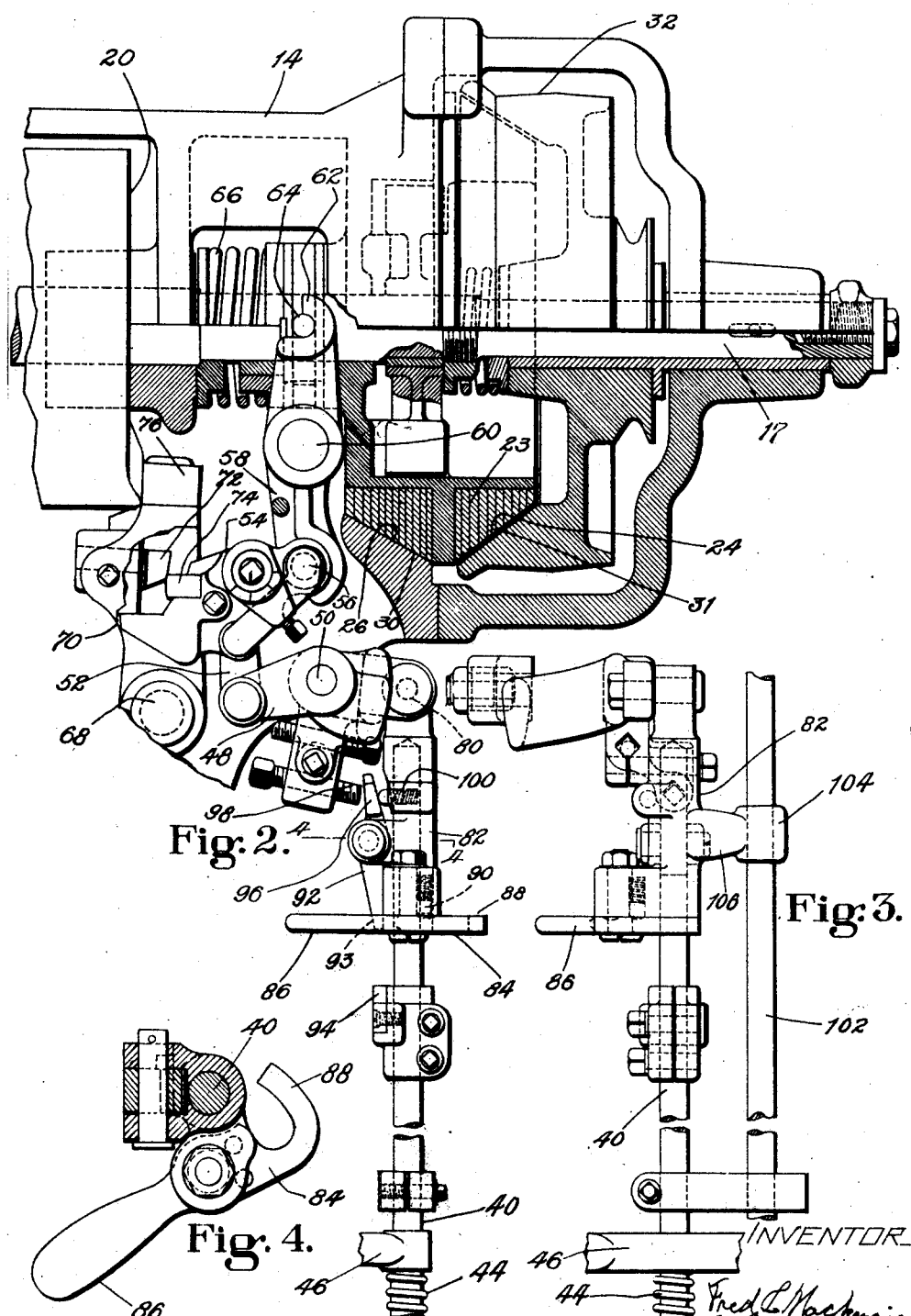

1,675,569

UNITED STATES PATENT OFFICE.

FRED L. MACKENZIE, OF BEVERLY, MASSACHUSETTS, ASSIGNOR TO UNITED SHOE MACHINERY CORPORATION, OF PATERSON, NEW JERSEY, A CORPORATION OF NEW JERSEY.

FASTENING-INSERTING MACHINE.

Application filed February 15, 1923. Serial No. 619,183.

This invention relates to controlling mechanism for machinery, and is illustrated herein as embodied in mechanism so arranged that a machine such as a fastening inserting machine may be caused to operate through a single cycle of operation and then come to rest, even though the treadle or other controller of the machine be maintained displaced for an indefinite period, or, alternatively, at the will of the operator, to operate as long as the treadle is maintained displaced.

Fastening inserting machines of a number of known types are arranged to be started by the depression of a treadle and to continue to operate as long as the treadle is maintained depressed. In the use of such machines it is frequently desirable to insert only a single fastening in the work. Heretofore the insertion of a single fastening by one of these machines has been a somewhat troublesome operation necessitating some considerable skill and close attention on the part of the operative by reason of the rapid operation of such machines, for if the treadle be maintained depressed too long a time, even by a very small fraction of a second, another fastening will be driven, often greatly to the detriment of the work. It is, accordingly, an object of the invention to provide simple and effective mechanism by which machines of this character may be caused to operate through a single cycle, driving a single fastening and then coming to rest even though the treadle be maintained depressed for an indefinite period. A further object of the invention is to provide a controlling mechanism of this sort of such construction that it may be caused alternatively, at the will of the operative, to permit the machine to operate indefinitely through a series of cycles of operation, that is to say as long as the treadle is maintained depressed.

In connection with the foregoing it should be understood that the words "treadle" and "depressed" are used for purposes of illustration and convenience and that so far as the invention is concerned it is in various of its aspects immaterial whether the machine is controlled through a treadle or through some other suitable controller, or whether the treadle or other controller is depressed or moved otherwise to initiate the operation of the machine. For this reason these words should be taken throughout the specification and claims in an illustrative rather than in a restrictive sense except where the context or the state of the prior art clearly requires the latter.

With the above and other objects in view the invention will now be described in connection with the accompanying drawings and pointed out in the claims.

In the drawings,

Fig. 1 is a side elevation of a fastening inserting machine embodying the present invention;

Fig. 2 is a side elevation of the clutch of the machine and controlled mechanism therefor;

Fig. 3 is a rear elevation of a portion of the controlling mechanism of Fig. 2; and Fig. 4 is a horizontal section on the line 4—4 of Fig. 2.

The illustrated machine is of the general type illustrated in U. S. Letters Patent Nos. 1,011,941, granted Dec. 19, 1911, and 1,030,775, granted June 25, 1912, on applications of George Goddu, to which reference may be made for further details of construction and operation of the machine.

The illustrated machine is provided with a column 12 supporting a head 14 and a work support 16. In the head is mounted a main cam shaft 14 carrying a plurality of cam members 18, 20, arranged to operate the fastening inserting and other instrumentalities of the machine. Upon the head are mounted fastening inserting and work feeding instrumentalities 22 including a driver and an awl. The latter with its operating mechanism may be omitted from the machine if the work for which the machine is intended is of a character which renders an awl unnecessary. In the illustrated machine, however, as in the machine disclosed in said Letters Patent of the United States No. 1,030,775, the awl is utilized to feed the work.

A clutch member 23 having a clutch surface 24 and a brake surface 26 is splined upon shaft 17 and is arranged to contact with a stationary brake member 30 or a clutch surface 31 of a continuously driven pulley 32 loose upon shaft 16, according as the machine is at rest or in operation.

The machine is provided with a controlling member illustrated as a treadle 34 by means of which the operative controls the work support 16 through mechanism indicated at 36 which may be and as shown is substantially in accordance with the disclosure of the above-mentioned Letters Patent of the United States No. 1,011,941. This treadle is also utilized to control the clutch operating mechanism by mechanism which will now be described.

Connected to the rear end of treadle 34 and arranged to be elevated by the depression of the treadle is a slidably mounted rod 40 provided with a clamp collar 42 against which bears the lower end of a spring 44 which bears at its upper end against a stationary abutment 46 carried by the column 12 of the machine, and tends to move rod 40 downwardly when the treadle is released. At its upper extremity rod 40 is connected through connections hereinafter described with a lever 48 (Fig. 2) fulcrumed at 50 to the head of the machine and connected by a link 52 with a lever 54 fulcrumed at 56 to the lower end of a lever 58, the latter being fulcrumed at 60 to the head of the machine and formed at its upper end with a bifurcated hook-shaped extremity 62 arranged to engage a pair of pins 64 carried by the hub of clutch member 23. A spring 66 bearing against the hub of clutch member 23 tends to move that clutch member into power transmitting position. Fulcrumed at 68 to the head of the machine is a lever 70 provided with an adjustable stop 72 arranged to co-operate with a block 74 carried by lever 54. Lever 70 also is provided with a roll 76 arranged to be brought into operative relation with cam 20 when machine is to be stopped. Disregarding for the time being the details of the connection between rod 40 and lever 48, when the machine is to be started treadle 34 is depressed, rod 40 elevated, lever 48 rocked in a counter-clockwise direction as viewed in Fig. 2, and the left hand end of lever 54 depressed so that block 74 moves out of engagement with stop 72. This permits spring 66 to move clutch member 23 into power transmitting position. On the other hand, when it is desired to stop the machine the releasing of the treadle permits rod 40 to be depressed under the action of spring 44, thus rocking lever 48 in a clockwise direction as viewed in Fig. 2, and lifting the left hand end of lever 54 so that block 74 is engaged by stop 72, and when the rise of cam 20 next comes into engagement with roll 76 lever 54 is forced bodily to the right, as viewed in Fig. 2, rocking lever 58 in a counter-clockwise direction, compressing spring 66, and moving clutch member 23 out of contact with pulley 32 and into contact with brake surface 30. It should be noted that when the treadle is released the clutch is not thrown out of operation until cam member 20 has reached the position at which its rise contacts with roll 76, so that the machine always completes the cycle of operation upon which it is engaged when the treadle is released before it comes to rest.

In order to adapt the machine to work in which it is desired to drive only a single nail, and to insure that the machine will come to rest after completing only a single cycle of operation, mechanism which will now be described is provided, this mechanism constituting the connections between rod 40 and lever 48 above referred to.

Pivoted at 80 to lever 48 is a sleeve 82 receiving the upper end of rod 40 and providing a fulcrum for a controlling lever 84 formed at one end with a handle 86 and at the other with a hook 88 arranged to receive rod 40. A spring-pressed plunger 90 (Fig. 2) housed in sleeve 82 tends to hold lever 84 in whatever position it may be adjusted. Fulcrumed also to sleeve 82 is a dog 92 having a downwardly extending end 93 arranged in the path of movement of a collar 94 adjustably clamped to rod 40 and an upwardly extending end 96 arranged in the path of movement of an adjustable trip member 98 carried by a lug formed upon lever 48. A spring-pressed plunger 100 also carried by sleeve 82 tends to rock the upper end 96 of dog 92 toward trip member 98. A rod 102 capable of relative movement with respect to rod 40 has sliding engagement at 104 with an arm 106 carried by sleeve 82, thus serving as a guide for the latter.

When it is desired to operate the machine through a single cycle of operation lever 84 is swung to its inoperative position where it is disengaged from rod 40. Then, when the treadle is depressed and rod 40 moves upwardly, collar 94 engages the lower end of dog 92, lifting sleeve 82 and rocking lever 48 to throw the clutch into operation as hereinbefore described. When lever 48 is thus rocked, trip member 98 moves into engagement with the upper end of dog 92, rocking that dog in a clockwise direction as viewed in Fig. 2, and disengaging the lower end of dog 92 from collar 94. This permits sleeve 82 to drop (sleeve 82 and rod 40 being slidably connected) with the consequent rising of lever 54 so that the clutch is disconnected when the rise of cam 20 comes around into engagement with roll 76.

On the other hand, if it is desired to operate the machine through a series of cycles of operation, that is to say, to cause it to continue to insert fastenings as long as the treadle is maintained depressed, lever 84 is swung around so that its hook-shaped end embraces rod 40. Then when the treadle is depressed, collar 94 contacts with the hook-shaped end of lever 86, raises sleeve 82 and maintains that sleeve raised as long as the treadle remains depressed.

Having described my invention, what I claim as new and desire to secure by Letters Patent of the United States is:

1. A fastening inserting machine having in combination, fastening inserting instrumentalities, a clutch operable to transmit power to said instrumentalities, two controllers, and connections from said controllers to the clutch arranged to cause movement of one of the controllers to render the clutch operative to transmit power to said instrumentalities and to cause the position of the other controller to determine whether the clutch will transmit power through only a single cycle of operation or as long as the first controller remains displaced.

2. A fastening inserting machine having, in combination, fastening inserting means, a treadle, and mechanism connected to the treadle and controlling the fastening inserting means, operable at the will of the operative either to cause the machine to insert a single fastening and then to stop, even though the treadle be maintained in machine operating position for an indefinite period, or to insert fastenings in a series as long as the treadle is maintained in machine operating position.

3. A fastening inserting machine having, in combination, fastening inserting instrumentalities, cyclically operating means for transmitting power to said fastening inserting instrumentalities, and a plurality of controllers for the machine, displacement of the first of which causes the transmission of power to said fastening inserting instrumentalities and the position of the second of which determines whether the machine operates through a single cycle of operation and then comes to rest or continues to operate as long as the first controller remains displaced.

4. Power-transmitting means having, in combination, a clutch, two controllers, and connections from the controllers to the clutch arranged so that displacement of one of the controllers causes the clutch to transmit power, and the position of the other controller determines whether the clutch continues to transmit power as long as the first controller remains displaced or is disconnected at the end of the first revolution of the clutch.

5. Controlling mechanism having, in combination, a clutch, a lever arranged by its rocking movement to render the clutch either operative or inoperative, a dog arranged to transmit rocking movement to said lever, and a lug carried by the lever arranged to throw said dog into inoperative position when the lever is rocked to render the clutch operative.

6. Controlling mechanism having, in combination, a clutch, a lever arranged by its rocking movement to render the clutch either operative or inoperative, a dog arranged to transmit rocking movement to the lever, a lug carried by the lever and arranged to move the dog into inoperative position upon movement of the lever into clutch operating position, and means for moving the lever into clutch operating position independently of the dog.

7. Controlling mechanism having, in combination, a clutch, a member arranged by its movement to render the clutch either operative or inoperative, a dog arranged to transmit movement to said member, and means carried by said member arranged to throw said dog into inoperative position when said member is moved to render the clutch operative.

8. Controlling mechanism having, in combination, a clutch, a member arranged by its movement to render the clutch either operative or inoperative, a dog arranged to transmit movement to said member, a lug carried by said member and arranged to move the dog into inoperative position upon movement of said member into clutch operating position, and means for moving said member into clutch operating position independently of the dog.

9. Controlling mechanism having, in combination, a clutch, a lever arranged by its rocking movement to render the clutch either operative or inoperative, a member arranged to transmit rocking movement to said lever, and means carried by the lever arranged to move said member into inoperative position when the lever is moved to render the clutch operative.

10. Controlling mechanism having, in combination, a clutch, a lever arranged by its rocking movement to render the clutch either operative or inoperative, means arranged to transmit movement to the lever, a lug carried by the lever arranged to render said means inoperative upon movement of the lever into clutch operating position, and means for moving said lever into clutch operating position independently of said movement transmitting means.

11. A machine for operating upon shoes having, in combination, operating instrumentalities, a member movable to initiate operation of the machine, and two parts movable into and out of the path of movement of said member, arranged alternatively to control the operation of the machine and to cause the machine to operate as long as one of said parts is in the path of movement of said member, and means operable on one of said parts to move that part out of the path of said member during the first cycle of operation after the machine is started.

12. A single revolution controlling mechanism comprising a clutch, a lever arranged when in one position to cause the clutch to become operative and when in another position to release the clutch, a sleeve pivoted to said lever, a dog carried by said sleeve, means movable into engagement with the dog to cause the sleeve to move the lever into clutch operating position, and means carried by the lever arranged upon movement of the lever into clutch operating position to release the dog from the engaging means, thereby permitting the lever to move to clutch releasing position.

In testimony whereof I have signed my name to this specification.

FRED L. MACKENZIE.